Oct. 25, 1955     C. ANDERSON     2,721,757
CARGO SLING

Filed March 6, 1952     2 Sheets-Sheet 1

INVENTOR.
CARTER ANDERSON
BY Glenn Orlob
AGENT

Oct. 25, 1955

C. ANDERSON 2,721,757

CARGO SLING

Filed March 6, 1952

INVENTOR.
CARTER ANDERSON
BY
Glenn Orlob
AGENT

United States Patent Office 2,721,757
Patented Oct. 25, 1955

2,721,757

CARGO SLING

Carter Anderson, Seattle, Wash., assignor to Boeing Airplane Company, Seattle, Wash., a corporation of Delaware Application March 6, 1952, Serial No. 275,148

3 Claims. (Cl. 294—81)

This invention relates to hoisting apparatus and more particularly to an improved cargo sling.

The cargo sling comprises a reinforced straight tubular cross-bar with a central aperture and with key slots evenly spaced from each end providing multiple fastening places for chains located adjacent to the sides of a load and attached to grippers that are placed under the load.

The purpose of the invention is to provide a strong, lightweight cargo sling for quick, secure attachment to box containers of variable sizes.

It is an object of the invention to provide a cargo sling with a cross bar that remains in contact with the load during the lifting operation.

It is an object of the invention to provide a cargo sling that requires a minimum of space above a load permitting the unobstructed raising of the load to the hoisting mechanism.

The purpose and objects of the invention will become more apparent as the following description is read with reference to the drawings wherein the same part is identified by a like numeral throughout the views. In the drawings.

Figure 1:
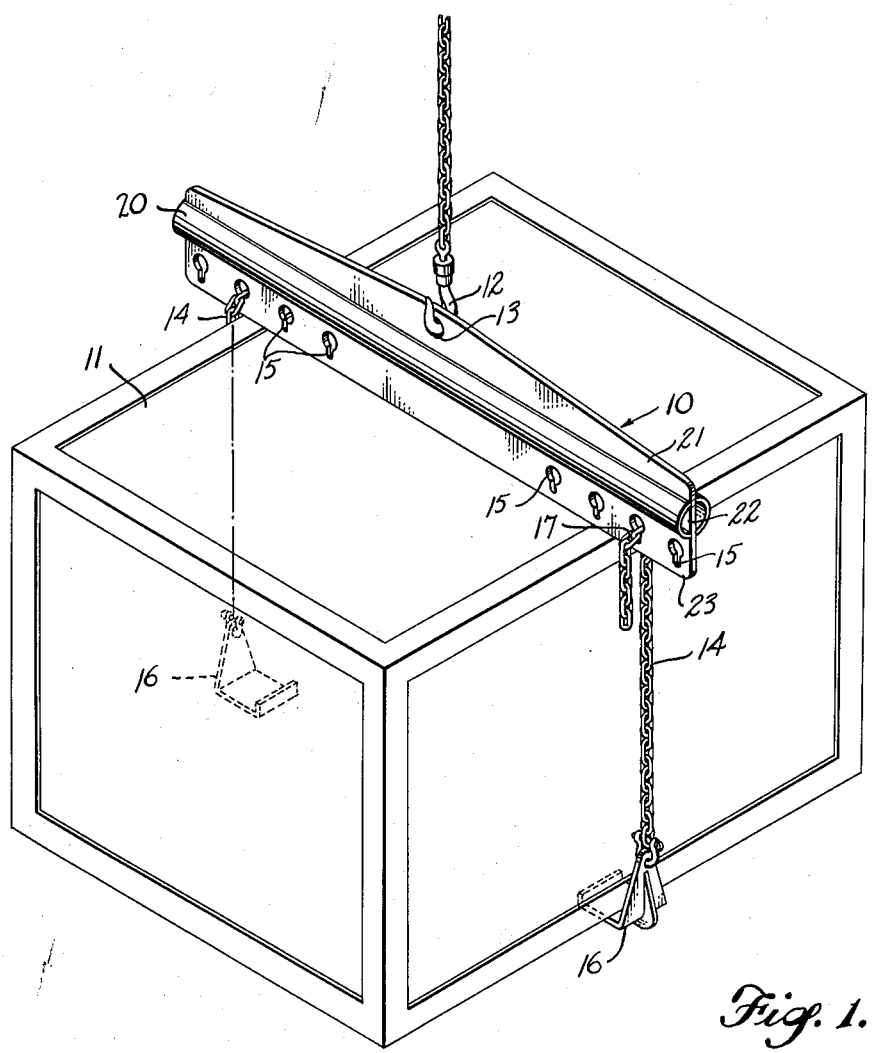
Figure 1 is a perspective view of a load supported by the cargo sling.

Figure 1 shows the lifting position of the component parts of the cargo-sling. The cross-bar 10 is centered on the load 11 and the hoist cable hook 12 is secured in the center aperture 13. The chains 14 on both sides of the load 11 are secured to the cross-bar 10 by link receiving key slots 15 and to the hook-like grippers 16 that support the load 11.

Figure 2:
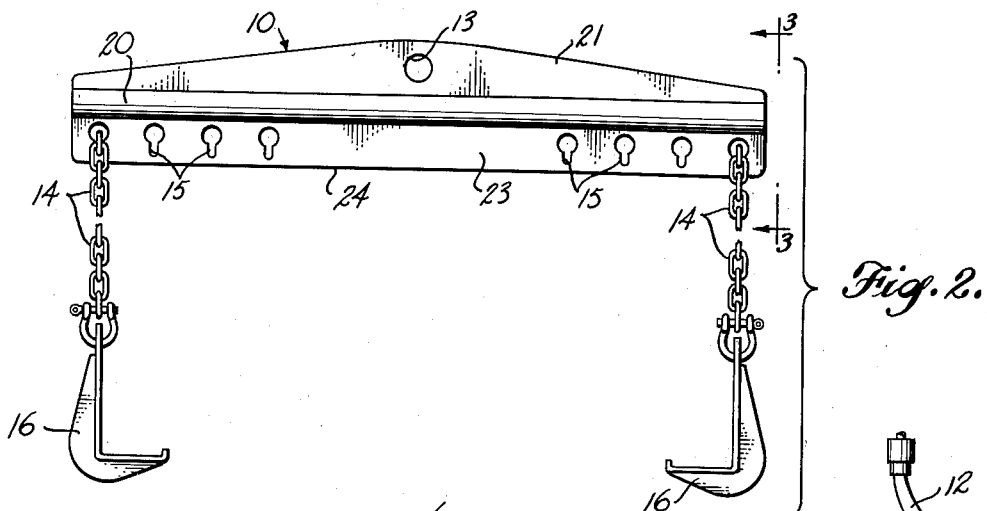
Figure 2 is an elevation of the cargo sling.
Figure 3:
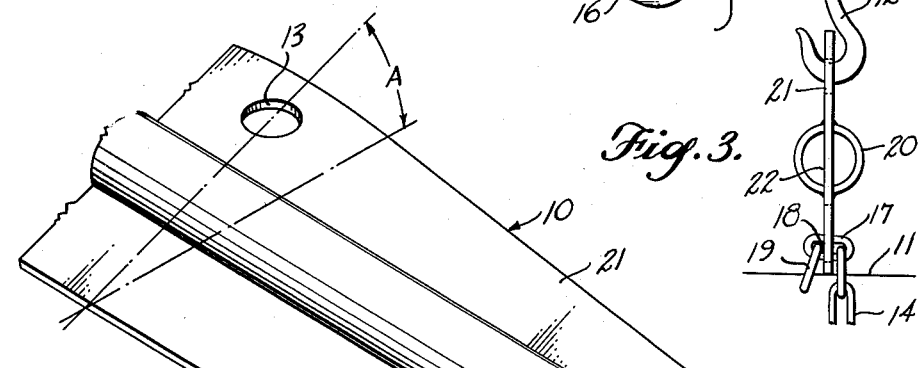
Figure 3 is an end view of the cargo sling.

Figures 2 and 3 show how the chains 14 may be readily adjusted as to length and position. The key slots 15 will firmly hold a chain by receiving one link 17 and serving as an abutment 18 against which the adjacent link 19 bears upon the application of the lifting force. The use of a plurality of slots 15 permits the relocation of the chains 14 upon lifting loads of variable sizes, so the chains 14 will be substantially parallel to and adjacent to the sides of the load 11 at all times.

Figure 4:
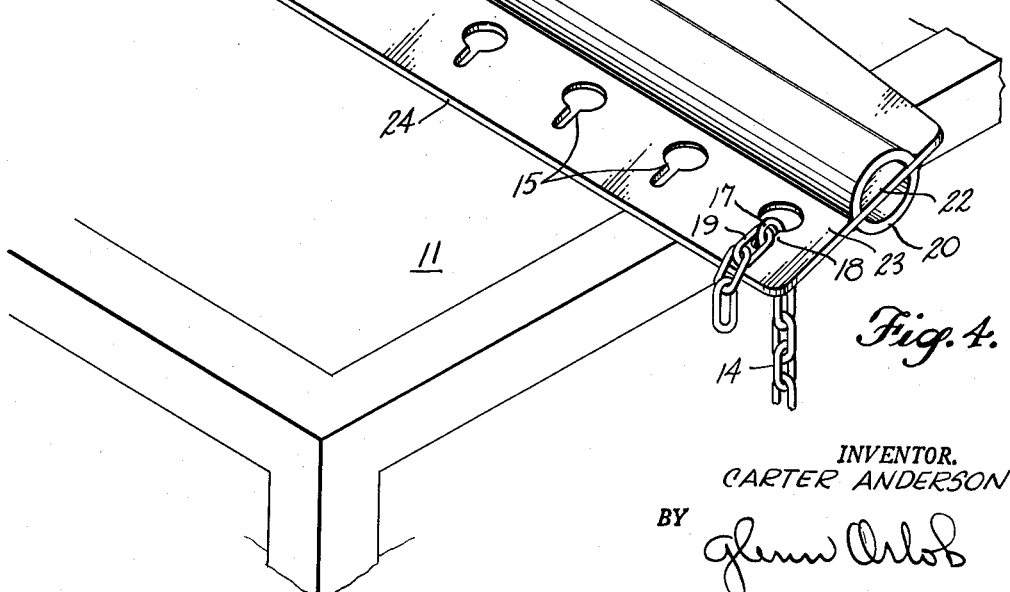
Figure 4 is a partial perspective view of the cargo sling cross-bar placed on the load prior to the lifting operation.

Figure 4 illustrates how the cross-bar 10 rests on the load, assuming an angular position with respect to the top of the load, noted by angle A. The cross-bar 10 comprises a shaped flat bar or plate member 22 reinforced on each side at its midsection by sections of a tubular member 20. The top portion 21 of the bar member 22 has the aperture 13 to receive the hoist cable hook 12 and the bottom portion 23 of the bar member 22 has the plurality of key slots 15 to receive the chain links 17.

The effective use of the cargo sling is accomplished by placement of the cross-bar 10 on the load 11 as indicated in Figure 4 so that it is located substantially midway between the ends of the load 11 and perpendicular to the major axis of the load 11. The grippers 16 are placed below the load 11 in line with the cross-bar 10 and the chains 14 are drawn taut as the links 17 are manually placed in the key slots 15. Then as the hoist mechanism (not shown) is employed to raise the load with the cable hook 12 inserted through the aperture 13, the lifting force initially rotates the cross-bar 10 about its bottom edge 24 which firmly bears against the top of the load 11. Upon continued rotation the key slots 15 are raised relative to the load 11 further tightening the chains.

In the final lifting position the angle A approximates ninety degrees and all the components of the cargo-sling reliably embrace the load insuring the safety of both the operating personnel and the load during the lift and transfer operation.

Having now particularly described and ascertained the nature of the said invention and in what manner the same is to be performed, I declare that what I claim is:

1. A cargo sling comprising a cross-bar with reinforced tubular sections and with extending top and bottom flanges for placement on a load in an angular position, the top flange formed to receive a hoist hook at its midpoint and the bottom flange formed with a plurality of key slots spaced above the bottom edge of the flange, chains firmly held in the key slots under load and L-shaped grippers attached to the said chains and formed with an irregular surface for holding the load, the cargo sling increasing its holding power upon hoisting as the cross-bar pivots on its lower edge which bears firmly against the top of the load and the accompanying lever action tightens the chains as the key slots are raised relative to the top of the load.

2. A cargo sling comprising a cross-bar with central, transverse reinforced tubular sections and with extending top and bottom flanges for placement on a load in an angular position resting on both its lower edge and a portion of a tubular section, the top flange formed to receive a hoist hook at its midpoint and the bottom flange formed with a plurality of key slots spaced above the bottom edge across the bar, and chains firmly held in the key slots and L-shaped grippers attached to the chains and formed with an irregular surface for holding the load, the cargo sling increasing its holding grip as the initial hoisting power is applied causing the cross-bar to pivot on its lower edge which bears firmly against the top of the load whereby the accompanying lever action tightens the chains as the key slots are raised relative to the top of the load.

3. A cargo hoisting and gripping device for handling substantially rectangular objects comprising a cross-plate having an upper and lower edge, a hoist hook attachment means near its upper edge and multiple chain securing means spaced above its bottom edge, chains for attachment to the chain securing means, and hooks attached to the lower chain ends for underlying the bottom of the cargo, the location of the multiple chain securing means above the bottom edge of the crossplate assuring the tightening of the bottom edge against the top of the rectangular object as the crossplate rotates into a vertical position raising the chain attachment means above the top of the cargo when a hoisting force is transmitted to the crossplate through the hoist hook attachment means.

References Cited in the file of this patent

UNITED STATES PATENTS

| | | |
|---|---|---|
| 767,861 | Brown | Aug. 16, 1904 |
| 1,326,969 | Rounds | Jan. 6, 1920 |

OTHER REFERENCES

"Ford Field," July 1949, published by H. A. Apple, Milwaukee, Wis. (page 50, article titled "Lift Kit" is relied on—copy in Scientific Library and in division 34).